United States Patent [19]

Reimer

[11] 4,102,554
[45] Jul. 25, 1978

[54] INSTRUMENT CABINET

[75] Inventor: Richard C. Reimer, Oswego Township, Kendall County, Ill.

[73] Assignee: Equipto Electronics Corporation, Aurora, Ill.

[21] Appl. No.: 750,827

[22] Filed: Dec. 15, 1976

[51] Int. Cl.² .............................................. B65D 7/00
[52] U.S. Cl. ............................. 312/107; 312/257 SK; 312/208; 220/4 R
[58] Field of Search ......... 312/107, 208, 100, 257 SK, 312/257 SM, 248; 16/124; 220/4 R, 4 F, 94 A

[56] References Cited

U.S. PATENT DOCUMENTS

| | | | |
|---|---|---|---|
| 550,109 | 11/1895 | Poole | 220/4 R |
| 2,144,523 | 1/1939 | Brown | 220/4 R |
| 2,457,023 | 12/1948 | Zelt | 220/4 R |
| 2,475,079 | 7/1949 | Clouse et al. | 312/257 SK |
| 2,550,362 | 4/1951 | Logie | 220/4 R |
| 2,610,756 | 9/1952 | Best | 220/4 R |
| 2,619,251 | 11/1952 | Schmidt | 220/94 A |
| 3,473,690 | 10/1969 | Cazenove | 220/94 A |
| 3,498,597 | 3/1970 | Roberts et al. | 220/4 R |
| 3,687,325 | 8/1972 | Simons | 220/4 F |
| 3,711,175 | 1/1973 | Sottsass, Jr. | 312/208 |

FOREIGN PATENT DOCUMENTS 1,173,744  3/1959  France ................ 220/4 F

*Primary Examiner*—Paul R. Gilliam
*Assistant Examiner*—Victor N. Sakran
*Attorney, Agent, or Firm*—Hill, Gross, Simpson, Van Santen, Steadman, Chiara & Simpson

[57] ABSTRACT

An instrument cabinet adapted to be constructed from simple sheet metal parts comprising top and bottom members, corner connector posts serving as panel mounts, and end opening defining end frame bezel means, all of the parts being conveniently secured in unitary assembly by means of simple machine screws. Inset handle means are provided along the major extent of each side of the cabinet.

10 Claims, 4 Drawing Figures

U.S. Patent   July 25, 1978   4,102,554
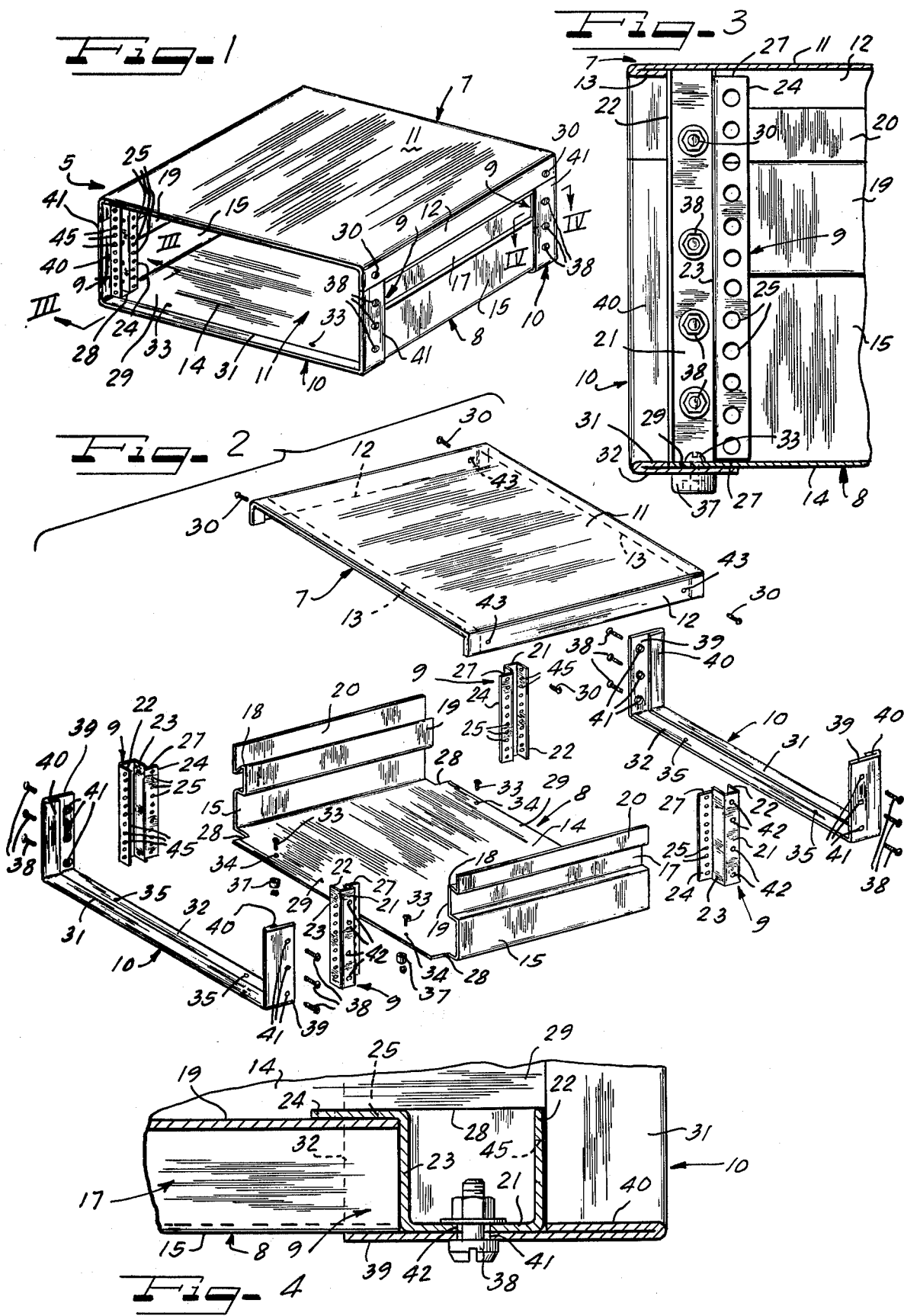

INSTRUMENT CABINET

This invention relates to a new and improved instrument cabinet, and is more particularly concerned with the type of cabinet especially useful for housing various types of electronic instruments mounted on panels so that they can be slipped into and out of the cabinet.

Equipment for testing various and sundry industrial equipment involves electronic testing instruments which are generally mounted on panels and housed in cabinets into which the instruments are adapted to be slipped and from which the instruments are generally desirably removable for service attention. Cabinets for this purpose as heretofore provided have been oftentimes of unduly costly construction, may utilize expensive extruded aluminum parts, frequently have parts requiring careful fitting, sometimes are made up of pieces which must be welded together and then the weld seams ground smooth. These undesirable characteristics have come about in attempts to assure that such cabinets be rugged and capable of withstanding stresses imposed by fairly heavy instrument units housed within the cabinets and also to permit the cabinets to be stacked one upon another in a testing laboratory or bench facility.

Another problem inherent in prior instrument cabinets has been lack of proper handle structure, especially to accommodate lifting of unevenly loaded cabinets.

It is, accordingly, an important object of the present invention to provide a new and improved instrument cabinet which will overcome the disadvantages, drawbacks, inefficiencies, shortcomings and problems inherent in prior cabinets of this type.

Another object of the invention is to provide a new and improved instrument cabinet of rugged, efficient, economical construction.

A further object of the invention is to provide a new and improved instrument cabinet in which all of the structural components are adapted to be made from simply formed sheet metal parts.

Still another object of the invention is to provide a new and improved instrument cabinet in which all of the parts are adapted to be secured together by means of simple machine screws and without any need for special fitting, grinding or welding.

Yet another object of the invention is to provide a new and improved instrument cabinet having novel handle means.

According to features of the present invention, there is provided an instrument cabinet providing an open ended chamber receptive of an electronic panel or the like therein, the chamber being defined by top, opposite side and bottom walls, the cabinet comprising a top member of generally U-shape cross section comprising a top panel having side flanges extending downwardly, a bottom member of generally U-shape cross section comprising a bottom panel having side flanges extending upwardly and cooperating with said top member side flanges, the members together defining an open end for the cabinet, electronic panel mounting and connector posts extending between the corners of said top and bottom panels contiguous to said flanges, a bezel end frame cooperatively related to said members and said posts at said open end, and means connecting said top and bottom members, said posts and said bezel end frame in unitary assembly, the side walls have handle grooves of angular cross section which provide substantial reinforcement for the side walls and also provide finger grip means comprising an upwardly offset flange structure along the top of each of the grooves. By having the reinforcing and handle grooves extending along substantially the entire front-to-rear extent of the side walls, lifting of the cabinet is facilitated even when unevenly loaded.

Other objects, features and advantages of the invention will be readily apparent from the following description of certain representative embodiment thereof, taken in conjunction with the accompanying drawing although variations and modifications may be effected without departing from the spirit and scope of the novel concepts embodied in the disclosure and in which:

FIG. 1 is an isometric view of an instrument cabinet embodying features of the invention.

FIG. 2 is an exploded assembly view of the cabinet.

FIG. 3 is an enlarged fragmentary vertical sectional detail view taken substantially in the plane of line III—III of FIG. 1; and FIG. 4 is an enlarged fragmentary horizontal sectional detail view taken substantially along the line IV—IV in FIG. 1.

An instrument cabinet 5 (FIG. 1) embodying features of the invention comprises a simple, efficient, rugged assembly in which a top member 7, a bottom member 8, combination corner connector and panel mount posts 9 and bezel means comprising end frame members 10 are secured together in a unitary assembly to define an instrument housing chamber 11 which is open at least at one end to receive an instrument therein, but, as is general practice, may be open at both ends. All of the enumerated component parts of the cabinet 5 are adapted to be readily formed from suitable sheet metal which may be aluminum or steel, as may be preferred. Another advantage of the disclosed arrangement resides in the relative standardization of components wherein the end frame bezels 10 are adapted to be contructed identically and the corner posts 9 are adapted to be constructed identically to each other, thereby substantially reducing the number of different piece parts that must be made for constructing the cabinet, and more particularly a production run of cabinets. It may also be observed that by virtue of the sheet metal construction of the structural components parts of the cabinet various vertical and horizontal cabinet dimensional requirements, that is sizes, can be easily and economically accommodated for housing a diverse range of instruments.

While in the preferred embodiment, the cabinet is comprised of sheet metal, it will be appreciated that it is possible that synthetic material be employed where such material would be of a uniform cross-sectional thickness so that the synthetic material would be sheet like.

The top member 7 has a top body panel 11 and opposite side downwardly extending flanges 12. Along the front and rear edges of the member 7, the top panel 11 and the side flanges 12 are provided on their inner sides with return bent reinforcing and finishing flanges 13, which not only provide stiffening reinforcement, but also present smooth edges at juncture of the return bent flanges.

The bottom section or member 8 comprises a bottom or body panel 14 and upstanding side flanges 15. In a preferred construction, the side flanges 15 are substantially wider than the flanges 12 of the top members 7, although if preferred the arrangement could be reversed by having the top member flanges 12 wider than the bottom member flanges 15. Whichever of the side flanges are wider, in this instance the side flanges 15, are provided with integral handle means, efficiently constructed in the form of an inset outwardly opening and preferably angular cross section groove 17 extending generally horizontally to and between the front and rear edges of the flanges 15 in each instance and desirably of a generally dove-tail upper finger grip structure 18. That is, the finger grip structure 18 is an upwardly offset and preferably generally upwardly recessed so that the fingers of a hand inserted into the grooves 17 for lifting the cabinet will attain a good, comfortable finger hold. It will be understood that the groove 17 should be of sufficient depth to accommodate the handle function. By having the handle groove and finger grip 18 throughout the front to rear extent of each of the flanges 15, a balanced lifting position can be readily attained even though the cabinet may be unevenly loaded in a front to rear direction. It will be appreciated, of course, that the handle grooves 17 also provides a substantial, rigid inwardly offset reinforcing rib 19 horizontally along each of the side flanges 15, whereby to provide substantial reinforcing beam strength for the cabinet side walls for which the the side flanges 15 provide the major component. Above the groove 17 the side walls 15 have upstanding respective panels 20 with which the side flanges 12 are adapted to overlappingly engage in the assembly.

Each of the combination panel mount and connector posts 9 is constructed and arranged to interfit with the top and bottom members 7 and 8 at the respective four corners of the assembly. For this purpose each of the posts 9 has a rigid multi-angular cross section affording great vertical compression and transverse beam strength. To this end a vertical body panel 21 has along one vertical edge a right angular flange 22 and along its opposite vertical edge a preferably coextensive parallel flange panel 23 which is provided along its distal vertical edge with a right angular panel flange 24 which projects away from the flanges 22 and 23. In the cabinet assembly, the post body panel 21 is adapted to serve as the attachment means of the post. The flange 22 is adapted to serve as instrument panel attachment means for the cabinet. The panel flange 24 is adapted to serve as assembly indexing means and also as instrument slide rail or other attachment or supporting means and for the this purpose is desirably equipped with a vertical series of screw holes 25.

In the cabinet assembly, each of the standarized posts 9 is indexably assembled with the adjacent end of the associated side flange 15 with the post panel 23 engaged against the contiguous end of the flange 15, including the rib 19 and the side panel 20. The flange panel 24 engages against the inside of the rib 19. In order to index and facilitate assembly with the bottom member 8 of each of the posts, the post flange panels 24 are shorter than the other flange panels of the post at least at one end, and for standardization purposes at both ends whereby to provide a clearance notch 27 substantially equal to the thickness of the material of the bottom panel 14 so as to accommodate the lower ends of the remaining panels 21, 22 and 23 of the posts in respective complementary corner notches 28 in the bottom panel 14 and between which notches the bottom panel 14 has respective end tongue attachment flange projections 29 beyond the ends of the side flanges 15. The height of the posts 9 is utilized to gauge the height of the cabinet chamber 11.

At their upper ends, the posts 9 are adapted to be received in the respective corners of the top member 7 with the post flanges 22 indexably assembled with the edges of the flanges 13. In such assembly, the upper end portions of the post 9 are secured as by means of machine screws 30 to the top member side flanges 12.

Assembly of the frame bezels 10 with the bottom panel 14 is facilitated by a return bent relatively narrow reinforcing and finishing flange 31 (FIGS. 1 and 2) on the upper side of a horizontal bar 32 of each of the bezels 10 and adapted to engage edgewise with the edge of the contiguous base panel tongue 29 (FIG. 3) which overlies the bar 32. Fastener means comprising machine screws 33 extend through screw holes 34 and 35 in respectively the tongue 29 and the bar 32 in each instance, securing the bezels to the base panel 14. In addition, the screws 33 desirably secure elastomeric cabinet-supporting pads or foot knobs 37 to the underside of the bars 32.

Means comprising machine screws 38 attach right angular coextensive arms 39 (FIGS. 2 and 4) at each end of each of the bezel bars 32 to the contiguous posts 9. To this end, relatively narrow inturned reinforcing and finishing flanges 40 on the inner sides of the arms 39 confront the posts 9. Substantial areas of the arms 39 lappingly engage the body panels 21 of the posts 9, with screw holes 41 in the arms matching screw holes 42 in the post panels 21 to receive the screws 38. It will be observed that the screw holes 42 adjacent the ends of the post panels 21 are symmetrically located so that they will match with screw holes 43 in the flanges 12 to accommodate the fastening screws 30 regardless of which end of the posts 9 are contiguous to the flanges 12 in each instance.

By having the arms 39 overlapping the ends of the cabinet side flanges 15, including the ends of the handle grooves 17, a neatly finished appearance is afforded for the sides of the cabinet.

In a preferred, efficient, sequence of assembly of the parts, two of the frame bezels 10 are secured in place to the bottom panel 14 of the bottom section 8. The panel mount posts 9 are secured in place to the side flanges 39 of the bezel section 10. The top section 7 is then brought into assembly with the bottom section 8. Finally all of the parts are secured together in unitary assembly by means of the several fasteners. It will be understood that the order of assembly just stated is merely by way of example.

In the completed assembly, the post flanges 22 lie in a common plane inset from the adjacent open end of the cabinet 5 by substantially the width of the return bent bezel flanges 31 and 40. This is a convenient location to receive instrument mounting means such as an instrument mounting panel or flanges when installing an instrument in the cabinet. To facilitate fastening an instrument panel or flanges, each of the flanges 22 is desirably provided with a longitudinal series of spaced screw holes 45.

From the foregoing it will be observed that the present invention provides a low cost instrument cabinet constructed of simple parts which are easy to assemble and after assembly provide a quite rugged cabinet structure of pleasing finished appearance. In addition to the desirable reinforcing attained thereby, the new and improved handle structure greatly facilitates handling the cabinet even with unbalanced loading.

It will be understood that variations and modifications may be effected without departing from the spirit and scope of the novel concepts of this invention.

I claim as my invention:

1. A sheet-material instrument cabinet providing an open-ended chamber receptive of an electronic panel or the like therein, the chamber being defined by top, opposite side and bottom walls, the cabinet comprising: a top member of generally U-shape cross section comprising a top panel having side flanges extending downwardly; a bottom member of generally U-shape cross section comprising a bottom panel having side flanges extending upwardly; a bottom member of generally U-shape cross section comprising a bottom panel having side flanges extending upwardly and disposed in cabinet side forming cooperation with said top member side flanges; said members together defining an open end for the cabinet; ribs along substantially the entire front-to-rear extent of the side walls to rigidify the side walls of the instrument cabinet; connector posts, which are also fastening surfaces for the intended panels, extending between corner areas of said top and bottom panels contiguous to said side flanges and with the opposite ends of the ribs providing locating means to assist in proper positioning of the connector posts relative to the opposite side walls, an end frame bezel cooperatively related to said members and said posts at said open end; means connecting said top and bottom members, said posts and said end frame bezel in unitary assembly; said ribs each having its opposite ends in direct abutting engagement with said posts to further rigidify the side walls of cabinet and means adjacent to said one end for receiving instrument mounting means, wherein said ribs being shaped into the form of outwardly opening handle grooves and comprising chennel portions formed in the opposite side walls thereof.

2. An instrument cabinet according to claim 1, wherein said grooves are of angular cross section providing substantial reinforcement for said side walls, said finger grip means comprise an upwardly offset flange structure along the top of each of the grooves.

3. An instrument cabinet according to claim 1, wherein said bezel is of generally U-shape having an elongated bar and coextensive right angular arms at the ends of said bar, said arms being in engagement with said posts, and said connecting means connecting said arms to the posts.

4. An instrument cabinet according to claim 3, wherein said posts engage endwise against said bezel bar.

5. An instrument cabinet according to claim 4, wherein said bezel bar and arms have return bent flanges narrower than the bars and arms and serving as reinforcing and finishing means and as spacers.

6. An instrument cabinet according to claim 1, wherein said top and bottom members cooperate to define open ends at each end of the cabinet, there being an end frame bezel at each end of the cabinet cooperatively related to the members and the posts at each of said ends.

7. An instrument cabinet according to claim 1, wherein said posts are of multi-flange angular cross section providing a body flange to receive said connecting means and flanges angular to said body flange, one of said angular flanges having means for attaching instrument mounting means thereto, and another of said angular flanges having means for cooperating with the side flanges of one of said members.

8. An instrument cabinet according to claim 1, wherein said bezel has a bar engaging said bottom panel, said connecting means securing said bar to said bottom panel, and cabinet supporting means secured to the underside of the cabinet by said connecting means.

9. An instrument cabinet providing an open-ended chamber receptive of an electronic panel or the like therein, which cabinet is manufactured essentially from sheet material as opposed to castings, the chamber being defined by top, opposite side and bottom walls, the cabinet comprising; a top member of generally U-shape cross section comprising a top panel having side flanges extending downwardly; a bottom member of generally U-shape cross section comprising a bottom panel having side flanges extending upwardly; a bottom member of generally U-shape cross section comprising a bottom panel having side flanges extending upwardly and disposed in cabinet side forming cooperation with said top member side flanges; said members together defining an open end for the cabinet; handle grooves along substantially the entire front-to-rear extent of the side walls to also rigidify the side walls of the instrument cabinet; connector posts, which are also fastening surfaces for the intended panels, extending between corner areas of said top and bottom panels contiguous to said side flanges and with the opposite ends of the handle grooves providing locating means to assist in proper positioning of the connector posts relative to the opposite side walls, an end frame bezel cooperatively related to said members and said posts at said open end; means connecting said top and bottom members, said posts and said end frame bezel in unitary assembly; and means adjacent to said one end for receiving instrument mounting means, said handle grooves being of angular cross section providing substantial reinforcement for said side walls, and finger grip means comprise an upwardly offset flange structure extending along the top of each of the grooves.

10. An instrument cabinet according to claim 1 wherein said side flanges of the top member and the side flanges of the bottom member are in partially overlapping relation, and removable fasteners extended through said lapped flanges securing said top and bottom members in unitary relation.

* * * * *